(12) United States Patent
Gu (10) Patent No.: US 11,399,151 B2
(45) Date of Patent: *Jul. 26, 2022

(54) SIGNAL CONVERSION CIRCUIT AND SIGNAL READOUT CIRCUIT

(71) Applicant: Shanghai Harvest Intelligence Technology Co., Ltd., Shanghai (CN)

(72) Inventor: Fengjun Gu, Shanghai (CN)

(73) Assignee: Shanghai Harvest Intelligence Technology Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,665

(22) Filed: May 17, 2021

(65) Prior Publication Data

US 2021/0274120 A1 Sep. 2, 2021

Related U.S. Application Data

(63) Continuation of application No. 16/784,923, filed on Feb. 7, 2020, now Pat. No. 11,039,100.

(30) Foreign Application Priority Data

Feb. 13, 2019 (CN) .......................... 201910118919.3

(51) Int. Cl.
*H04N 5/378* (2011.01)
*H04N 5/357* (2011.01)
*H01L 27/146* (2006.01)
*G06F 7/60* (2006.01)
*G06F 7/68* (2006.01)
*H03K 5/00* (2006.01)

(52) U.S. Cl.
CPC ........... *H04N 5/378* (2013.01); *H04N 5/3575* (2013.01)

(58) Field of Classification Search
CPC .. H04N 5/378; H04N 5/3575; H03K 5/00006; H03K 4/502; H03K 7/08; H03K 3/02; G06F 7/605; G06F 7/68; H01L 27/146
USPC ....... 348/308, 301, 302, 294, 138, 312, 285, 348/657, 697; 257/291, 292, 293, 246; 250/208.1, 370.08; 327/69, 51, 94, 144, 327/46, 54, 17, 67, 291; 341/110, 126, 341/155, 177, 159, 146
See application file for complete search history.

(56) References Cited

U.S. PATENT DOCUMENTS

| | | | |
|---|---|---|---|
| 5,856,686 A | 1/1999 | Watanabe et al. | |
| 5,960,033 A * | 9/1999 | Shibano | H04K 1/00 375/207 |
| 8,164,663 B2 | 4/2012 | Pain et al. | |

(Continued)

*Primary Examiner* — Marly S Camargo
(74) *Attorney, Agent, or Firm* — Harness, Dickey & Pierce, P.L.C.

(57) ABSTRACT

A signal conversion circuit and a signal readout circuit are provided. The signal conversion circuit includes: an operational amplifier, configured to amplify an electric signal output by a sensing array; an input switched capacitor, wherein an end of the input switched capacitor is configured to receive the electric signal output by the sensing array, and another end of the input switched capacitor is coupled with an input end of the operational amplifier; and a feedback switched capacitor, wherein an end of the feedback switched capacitor is coupled with the input end of the operational amplifier, and another end of the feedback switched capacitor is coupled with an output end of the operational amplifier.

19 Claims, 6 Drawing Sheets

(56) References Cited

U.S. PATENT DOCUMENTS

| | | | |
|---|---|---|---|
| 9,621,829 B1 * | 4/2017 | Boemler | H04N 5/3698 |
| 10,454,723 B1 * | 10/2019 | Kossel | H03H 7/39 |
| 10,567,712 B2 * | 2/2020 | Hikosaka | H04N 9/04515 |
| 11,039,100 B2 * | 6/2021 | Gu | H04N 5/378 |
| 2008/0158403 A1 | 7/2008 | Itano et al. | |
| 2009/0033779 A1 | 2/2009 | Mo | |
| 2009/0091648 A1 | 4/2009 | Lin et al. | |
| 2012/0242878 A1 | 9/2012 | Yoshida | |
| 2015/0062395 A1 | 3/2015 | Ono et al. | |
| 2017/0257605 A1 | 9/2017 | Iwakura et al. | |
| 2018/0115726 A1 * | 4/2018 | Yoshimura | H04N 5/363 |
| 2019/0149780 A1 | 5/2019 | Hikosaka | |
| 2020/0210673 A1 * | 7/2020 | Krah | G06K 9/00013 |

* cited by examiner

FIG. 6

SIGNAL CONVERSION CIRCUIT AND SIGNAL READOUT CIRCUIT

CROSS-REFERENCE TO RELATED APPLICATIONS

The present application is a continuation application of U.S. application Ser. No. 16/784,923, filed on Feb. 7, 2020, which claims priority to Chinese patent application No. 201910118919.3, filed on Feb. 13, 2019, and the entire disclosure of which is incorporated herein by reference.

TECHNICAL FIELD

The present disclosure generally relates to an electric circuit field, and more particularly, to a signal conversion circuit and a signal readout circuit.

BACKGROUND

An image sensor is an important part of a digital camera. Image sensors are mainly used in digital cameras, and imaging apparatus applied in industrial, media, medical and consumer electronics fields. With the increasing demand for cameras, camcorders and multimedia mobile phones, an image sensor market is growing rapidly. A signal readout circuit is an important part of an image sensor. Complementary Metal-Oxide-Semiconductor Transistor (CMOS) integrated circuits have gradually become dominant technology of signal readout circuits due to their low power consumption, low operating voltage and high integration.

A sensing array in an image sensor is used to convert optical signals into electric signals. Currently, sensing arrays mainly have a passive pixel structure. Charge signals or current signals sensed by the sensing array are read by an external signal readout circuit without being amplified. In recent years, sensing arrays with an active pixel structure have also gradually increased. Charge signals or current signals sensed by a sensing array with the active pixel structure are processed by a pixel circuit in an image sensor, and an amplified voltage or current is used as an output signal. Output signals of different sensing arrays have different forms or ranges.

Therefore, a new signal readout circuit is required, to read output signals of different sensing arrays.

SUMMARY

In an embodiment of the present disclosure, a signal conversion circuit is provided, including: an operational amplifier, configured to amplify an electric signal output by a sensing array; an input switched capacitor, wherein an end of the input switched capacitor is configured to receive the electric signal output by the sensing array, and another end of the input switched capacitor is coupled with an input end of the operational amplifier; and a feedback switched capacitor, wherein an end of the feedback switched capacitor is coupled with the input end of the operational amplifier, and another end of the feedback switched capacitor is coupled with an output end of the operational amplifier.

Optionally, the signal conversion circuit further includes an input switch, configured to control the input switched capacitor to access the signal conversion circuit or not; and a feedback switch, configured to control the feedback switched capacitor to access the signal conversion circuit or not.

Optionally, an equivalent impedance of the input switched capacitor and/or an equivalent impedance of the feedback switched capacitor are related to an output characteristic of the sensing array.

Optionally, the signal output by the sensing array comprises an electric signal selected from different kinds of electric signal.

Optionally, the signal output by the sensing array comprises a charge signal, a current signal or a voltage signal.

Optionally, the input switched capacitor comprises a first switch and a first capacitor, the first switch is configured to adjust an equivalent impedance of the input switched capacitor.

Optionally, the feedback switched capacitor comprises a second capacitor and a second switch connected in parallel, and a third switch connected with the second capacitor and the second switch, the second switch and the third switch are configured to adjust an equivalent impedance of the feedback switched capacitor.

Optionally, the sensing array comprises a passive pixel structure and outputs a charge signal, the input switch is configured to control the input switched capacitor to be short-circuited, the feedback switch is turned off, the second switch is turned off, and the third switch is turned on.

Optionally, the sensing array comprises a passive pixel structure and outputs a current signal, the input switch is configured to control the input switched capacitor to be short-circuited, the feedback switch is turned off, the second switch and the third switch of the feedback switched capacitor are controlled by a clock pulse signal having a first frequency, and a phase of the clock pulse signal of the second switch is opposite to a phase of the clock pulse signal of the third switch.

Optionally, the sensing array comprises an active pixel structure and outputs a current signal, the input switch is configured to control the input switched capacitor to be short-circuited, the feedback switch is turned off, the second switch and the third switch of the feedback switched capacitor are controlled by a clock pulse signal having a second frequency, and a phase of the clock pulse signal of the second switch is opposite to a phase of the clock pulse signal of the third switch.

Optionally, the sensing array comprises an active pixel structure and outputs a voltage signal, the input switch is turned off and the first switch of the input switched capacitor is controlled by a clock pulse signal, the feedback switch is turned off and the second switch and the third switch of the feedback switched capacitor are controlled by a clock pulse signal, and a phase of the clock pulse signal of the second switch is opposite to a phase of the clock pulse signal of the third switch.

Optionally, the signal conversion circuit further includes a pulse signal module, wherein the pulse signal module is configured to generate the clock pulse signals.

Optionally, the signal conversion circuit further includes a pulse signal module, wherein the pulse signal module is configured to generate the clock pulse signals.

Optionally, the signal conversion circuit further includes a pulse signal module, wherein the pulse signal module is configured to generate the clock pulse signals.

In an embodiment of the present disclosure, a signal readout circuit is provided, including: a plurality of readout branches, wherein each of the plurality of readout branches includes: the above signal conversion circuit.

Optionally, the signal readout circuit further includes a multiplexer module, configured to multiplex and output a plurality of output signals of a sensing array.

Optionally, the signal readout circuit further includes a sampling module, configured to perform correlated double sampling on an output signal of the signal conversion circuits and output an analog sampled signal.

Optionally, the signal readout circuit further includes an analog-to-digital conversion module, configured to convert the analog sampled signal output by the sampling module into a digital signal.

Optionally, the signal readout circuit further includes a pulse signal module, configured to output clock pulse signals with different frequencies to the signal conversion circuits to adjust equivalent impedance of the signal conversion circuits.

Optionally, the sensing array is disposed in a TFT image sensor.

Compared with existing techniques, embodiments of the present disclosure have following advantages.

Embodiments of the present disclosure provide a signal conversion circuit, including: an operational amplifier, configured to amplify an electric signal output by a sensing array; an input switched capacitor, wherein an end of the input switched capacitor is configured to receive the electric signal output by the sensing array, and another end of the input switched capacitor is coupled to an input end of the operational amplifier; a feedback switched capacitor, wherein an end of the feedback switched capacitor is coupled to the input end of the operational amplifier, and another end of the feedback switched capacitor is coupled to an output end of the operational amplifier. The electric signal output by the sensing array may be various, for example, may include a charge signal, a current signal or a voltage signal, and an equivalent impedance of the input switched capacitor and/or an equivalent impedance of the feedback switched capacitor are related to output characteristics of the sensing array. The signal conversion circuit includes the switched capacitor with an equivalent impedance, and the signal conversion circuit may adopt different conversion modes according to different signals output by the sensing array, so that the signal readout circuit can be applied to different sensing arrays. Therefore, when the sensing array is replaced or different sensing arrays are developed in system applications, the signal readout circuit can use the same operational amplifier, and it is only necessary to adjust other circuit elements according to the different sensing arrays, without redesigning and manufacturing the signal readout circuit, which may greatly reduce development time and cost of system products.

Further, a signal readout circuit is provided according to embodiments, which includes the pulse signal module that outputs pulse signals with different frequencies to the signal conversion circuit to adjust equivalent impedance of the signal conversion circuit. Therefore, the signal readout circuit can change component values in a wide range without increasing area cost, so that signals within a large range output by the sensing array can be processed.

DETAILED DESCRIPTION

Figure 1:
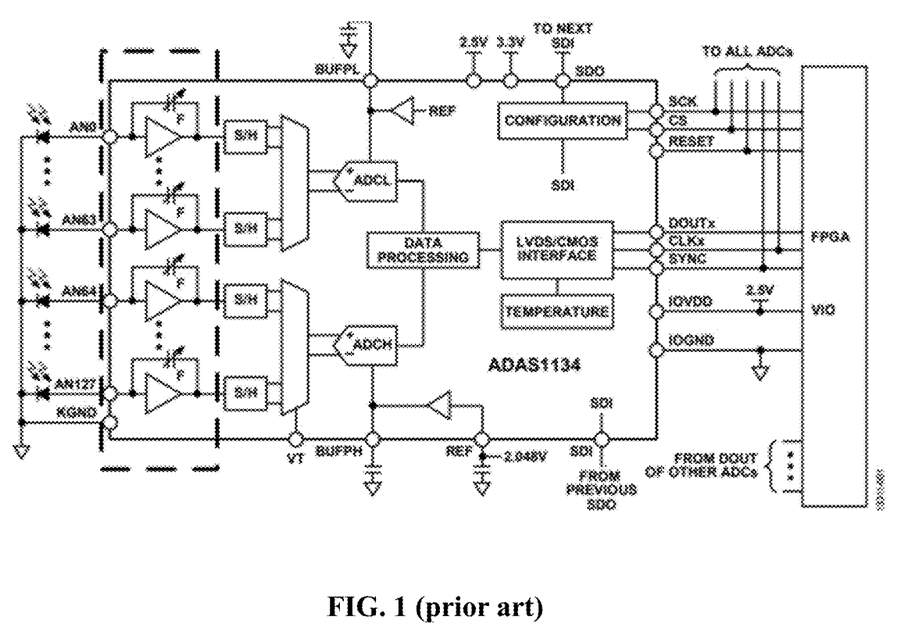
FIG. 1 schematically illustrates a structural diagram of a signal readout circuit in existing techniques.

Referring to FIG. 1, FIG. 1 schematically illustrates a structural diagram of a signal readout circuit in existing techniques.

The signal readout circuit as shown in FIG. 1 includes a plurality of readout branches which are configured to read signals output by a sensing array. Each readout branch includes a signal conversion module (structures in a dashed box in FIG. 1) which includes an operational amplifier and a variable capacitor. The signal conversion module reads a charge signal output from the sensing array and a current signal within a certain time through the variable capacitor, and converts the charge signal and the current signal into a voltage for subsequent correlated double sampling and analog-to-digital conversion.

However, corresponding external signal readout circuits need to be designed to process signals output by different sensing arrays, as each signal readout circuit has a single purpose and cannot be used universally. If an output signal of the sensing array is a voltage signal, the signal readout circuit shown in FIG. 1 cannot read the output signal. In addition, with the signal readout circuit shown in FIG. 1, although capacitance of capacitors in the signal conversion module can be adjusted, however, when a current changes by more than dozens of times, signals cannot be processed by using the same signal readout circuit, and different signal readout circuits need to be developed for different sensing arrays, which may increase cost in design, manufacturing and management.

Figure 2:
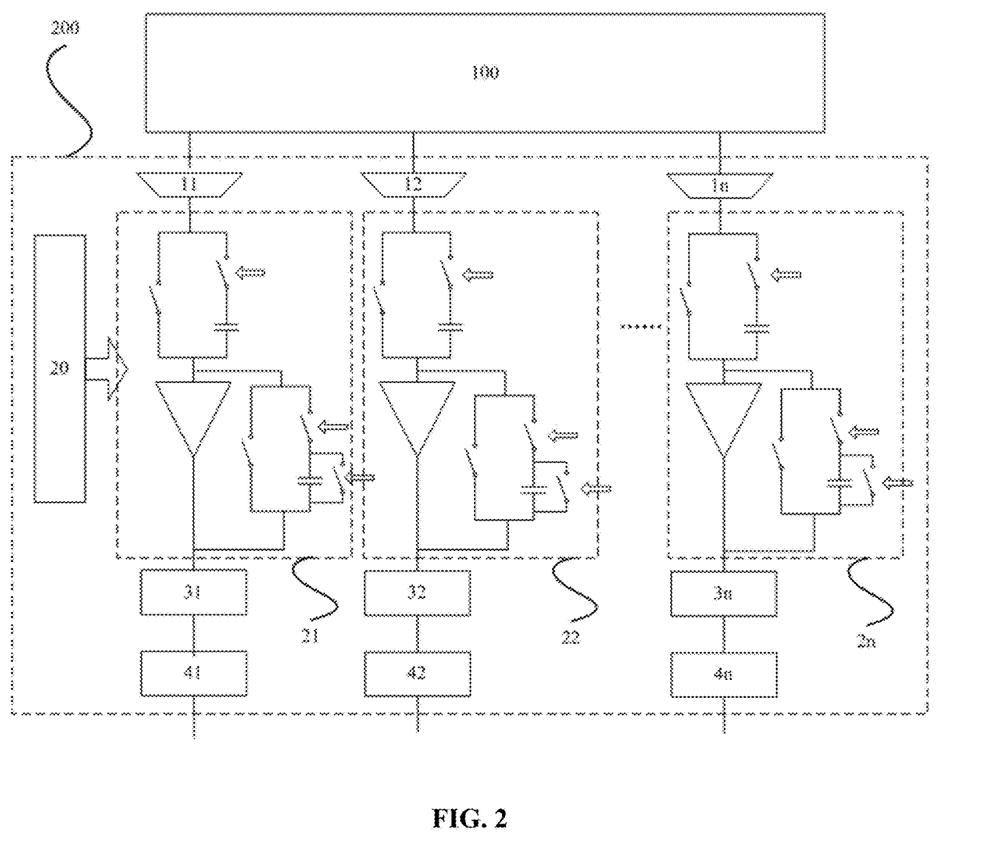
FIG. 2 schematically illustrates a structural diagram of a signal readout circuit according to an embodiment.

Referring to FIG. 2, FIG. 2 schematically illustrates a structural diagram of a signal readout circuit according to an embodiment.

As shown in FIG. 2, the signal readout circuit 200 is configured to read an electric signal output by a sensing array 100. The signal readout circuit 200 includes a plurality of readout branches for reading signals of rows and columns in the sensing array 100 respectively. Each readout branch includes a multiplexer module (11-1n), a signal conversion circuit (21-2n), a sampling module (31-3n) and an analog-to-digital conversion module (41-4n). In some embodiments, the signal readout circuit 200 further includes a pulse signal module 20.

In some embodiments, the multiplexer modules (11-1n) are used to multiplex and output multiple output signals of the sensing array, thereby reducing the number of pins of a chip and design complexity of the chip. The signal conversion circuits (21-2n) are configured to convert charge signals, current signals or voltage signals output by the sensing array into voltage signals to be output. The sampling modules (31-3n) perform correlated double sampling on output signals of the signal conversion circuit, and output analog sampled signals. By performing correlated double sampling on the signals output from the sensing array, interference of reset noises may be eliminated, and low-frequency noises may be suppressed. Therefore, a signal-to-noise ratio may be significantly improved, and signal detection accuracy may be improved, thereby improving quality of images acquired by an image sensor. The analog-to-digital conversion modules (41-4n) are configured to convert the analog sampled signals into digital signals to facilitate subsequent image processing.

In some embodiments, the pulse signal module 20 is configured to output clock pulse signals with different frequencies to the signal conversion circuits (21-2n) to adjust equivalent impedance of the signal conversion circuits. In some embodiments, the pulse signal module 20 outputs clock pulse signals with different frequencies to the signal conversion circuits (21-2n) according to different signals output by the sensing array.

In some embodiments, the multiplexer modules (11-1n), the sampling modules (31-3n), the analog-to-digital conversion modules (41-4n) and the pulse signal modules 20 may adopt different structures, which is not limited in embodiments of the present disclosure.

It should be noted that FIG. 2 is merely an example of the signal readout circuit. The signal readout circuit provided in embodiments of the present disclosure may not only include the above-mentioned modules as shown in FIG. 2. In some embodiments, the signal readout circuit 200 may further include other modules such as a shift register to perform corresponding data and signal processing.

In some embodiments, the sensing array is disposed in a Thin Film Transistor (TFT) sensor. The TFT sensor may be fabricated on a glass or a flexible plate, so that a relatively large fabrication area can be obtained.

Figure 3:
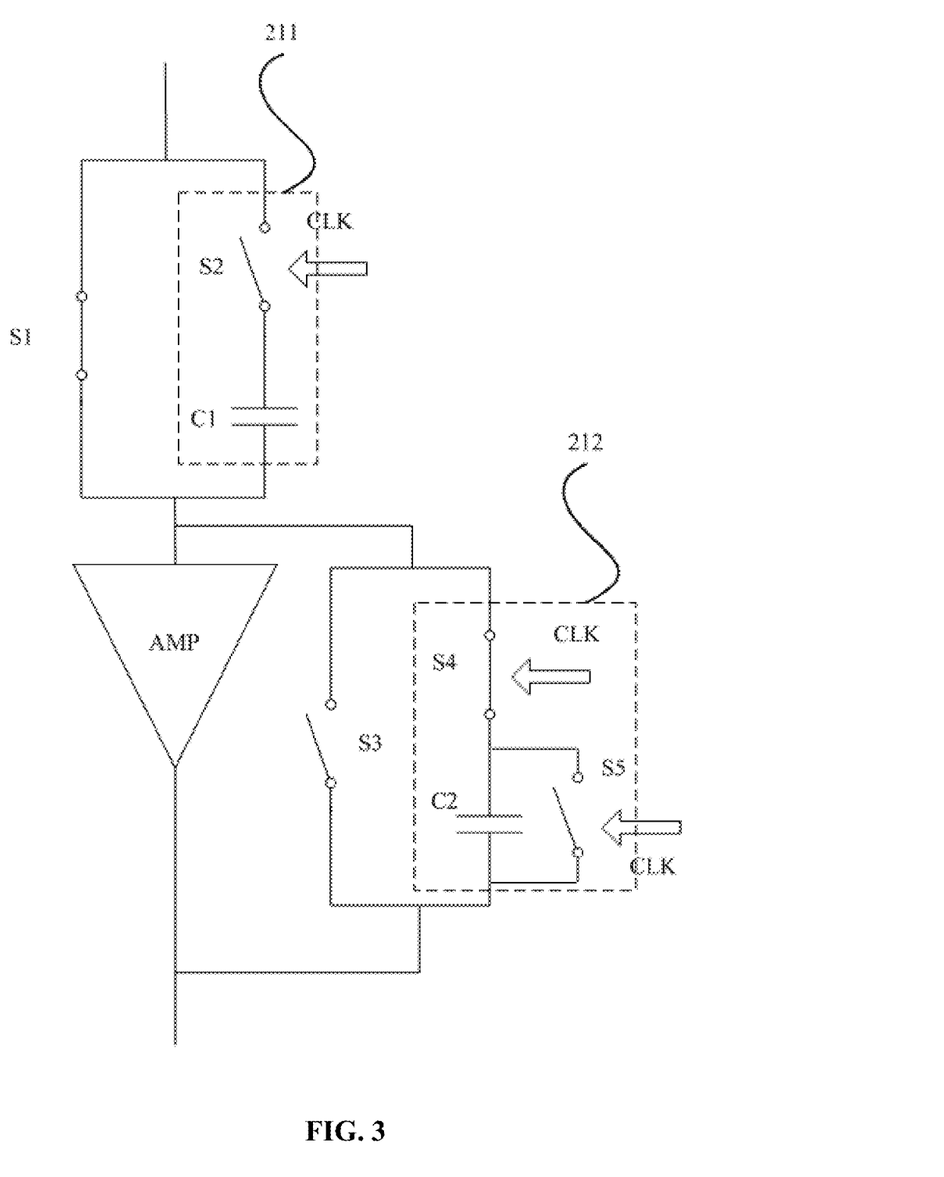
FIG. 3 schematically illustrates a diagram of a signal conversion circuit in a first conversion mode according to an embodiment.

FIG. 3 is taken as an example to specifically describe a structure of the signal conversion circuit.

The signal conversion circuit includes: an operational amplifier AMP, configured to amplify an electric signal output by a sensing array; an input switched capacitor 211, wherein one end of the input switched capacitor 211 is configured to receive the electric signal output by the sensing array, and the other end of the input switched capacitor 211 is coupled to an input end of the operational amplifier AMP; a feedback switched capacitor 212, wherein one end of the feedback switched capacitor 212 is coupled to the input end of the operational amplifier AMP, and the other end of the feedback switched capacitor 212 is coupled to an output end of the operational amplifier AMP; an input switch S1, configured to control the input switched capacitor 211 to access the signal conversion circuit or not; and a feedback switch S3, configured to control the feedback switched capacitor 212 to access the signal conversion circuit or not, wherein the electric signal output by the sensing array includes a charge signal, a current signal or a voltage signal, and equivalent impedance of the input switched capacitor 211 and/or the equivalent impedance of the feedback switched capacitor 212 are related to output characteristics of the sensing array.

In some embodiments, the input switch S1 is connected in parallel with the input switched capacitor 211, and the feedback switch S3 is connected in parallel with the feedback switched capacitor 212.

In some embodiments, the input switched capacitor 211 includes a first switch S3 and a first capacitor C1 connected in series. In some embodiments, the first switch S3 receives clock pulse signals. The pulse signal module outputs pulse signals with different frequencies to adjust equivalent impedance of the input switched capacitor 211.

In some embodiments, the feedback switched capacitor 212 includes a second capacitor C2 and a second switch S5 connected in parallel, and a third switch S4 connected in series with the second capacitor C2 and the second switch S5 connected in parallel. In some embodiments, similar to the first switch S3, the second switch S5 and the third switch S4 receive clock pulse signals. The pulse signal module outputs pulse signals with different frequencies to adjust equivalent impedance of the feedback switched capacitor 212.

Structures and states of the signal conversion circuit in different modes are described below with reference to FIGS. 3 to 6.

Referring to FIG. 3, FIG. 3 schematically illustrates a diagram of a signal conversion circuit in a first conversion mode according to an embodiment.

In some embodiments, the sensing array has a passive pixel structure and outputs a charge signal. In this case, the signal conversion circuit is in the first conversion mode. Under the first conversion mode, the input switch S1 is turned on, to control the input switched capacitor 211 to be short-circuited; the feedback switch S3 is turned off, the second switch S5 is turned off, and the third switch S4 is turned on.

When in the first conversion mode, the signal conversion circuit is equivalent to an integration circuit, and the second capacitor C2 is a capacitor of a femtofarad (fF) to picofarad (pF) level. In some embodiments, the second capacitor C2 receives a charge signal and outputs a voltage signal.

Figure 4:
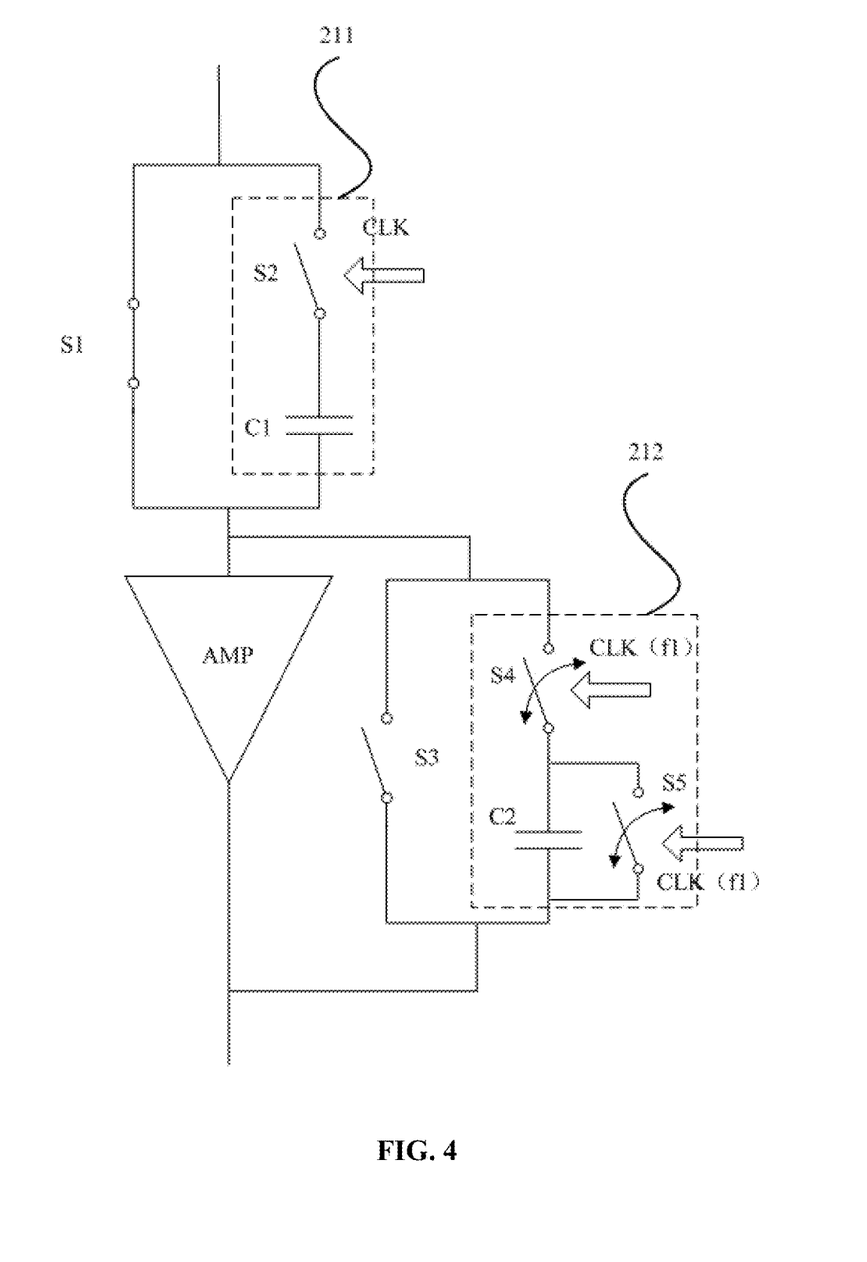
FIG. 4 schematically illustrates a diagram of a signal conversion circuit in a second conversion mode according to an embodiment.

Referring to FIG. 4, FIG. 4 schematically illustrates a diagram of a signal conversion circuit in a second conversion mode according to an embodiment.

In some embodiments, the sensing array has a passive pixel structure and outputs a current signal. In this case, the signal conversion circuit is in the second conversion mode. Under the second conversion mode, the input switch S1 is turned on to control the input switched capacitor 211 to be short-circuited; the feedback switch S3 is turned off, the second switch S5 and the third switch S4 of the feedback switched capacitor 212 are controlled by a clock pulse signal CLK with a first frequency f1, and a phase of the clock pulse signal CLK of the second switch S5 is opposite to a phase of the clock pulse signal CLK of the third switch S4.

When in the second conversion mode, the feedback switched capacitor 212 is equivalent to a resistor whose equivalent resistance is inversely proportional to a product of the first frequency f1 and capacitance of the second capacitor C2. In some embodiments, the equivalent resistance is within a range from 1 k$\Omega$ to 100 M$\Omega$. The second capacitor C2 receives a current signal and outputs a voltage signal.

Figure 5:
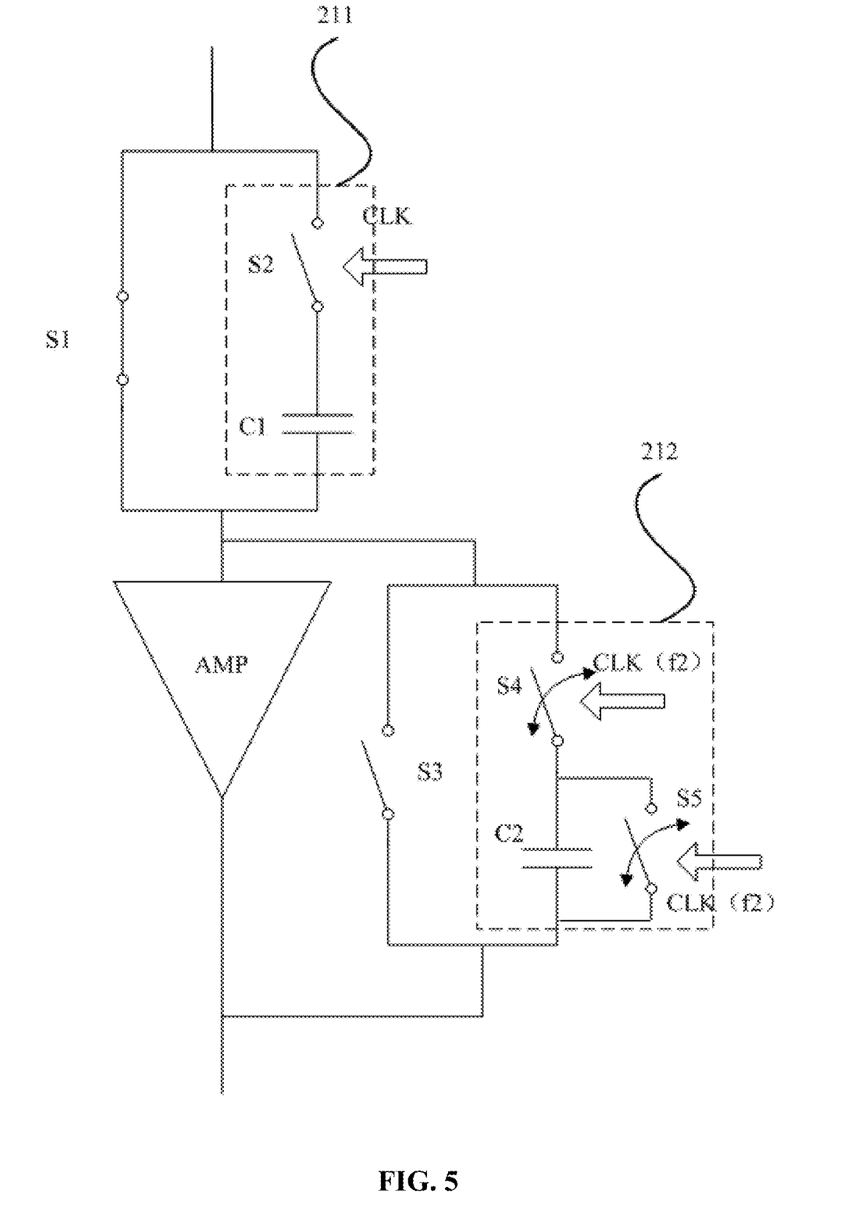
FIG. 5 schematically illustrates a diagram of a signal conversion circuit in a third conversion mode according to an embodiment.

Referring to FIG. 5, FIG. 5 schematically illustrates a diagram of a signal conversion circuit in a third conversion mode according to an embodiment.

In some embodiments, the sensing array has an active pixel structure and outputs a current signal. In this case, the signal conversion circuit is in the third conversion mode. Under the third conversion mode, the input switch S1 is turned on to control the input switched capacitor 211 to be short-circuited; the feedback switch S3 is turned off, the second switch S5 and the third switch S4 of the feedback switched capacitor 212 are controlled by a clock pulse signal CLK with a second frequency f2, and a phase of the clock pulse signal CLK of the second switch S5 is opposite to a phase of the clock pulse signal CLK of the third switch S4.

When in the third conversion mode, the feedback switched capacitor 212 is equivalent to a resistor whose equivalent resistance is inversely proportional to a product of the second frequency f2 and capacitance of the second capacitor C2. In some embodiments, the equivalent resistance is within a range from 1 kΩ to 100 MΩ. The second capacitor C2 receives a current signal and outputs a voltage signal.

Different from the second conversion mode, in the third conversion mode, the sensing array has an active pixel structure. Generally, the sensing array of the active pixel structure amplifies the output current signal. Therefore, compared with the signal conversion circuit in the second conversion mode, an amplitude of a current signal received by the signal conversion circuit in the third conversion mode is larger. Therefore, the second frequency f2 is higher than the first frequency f1, and the feedback switched capacitor 212 in the third conversion mode can obtain higher equivalent resistance, so as to process a current signal with a larger amplitude.

Figure 6:
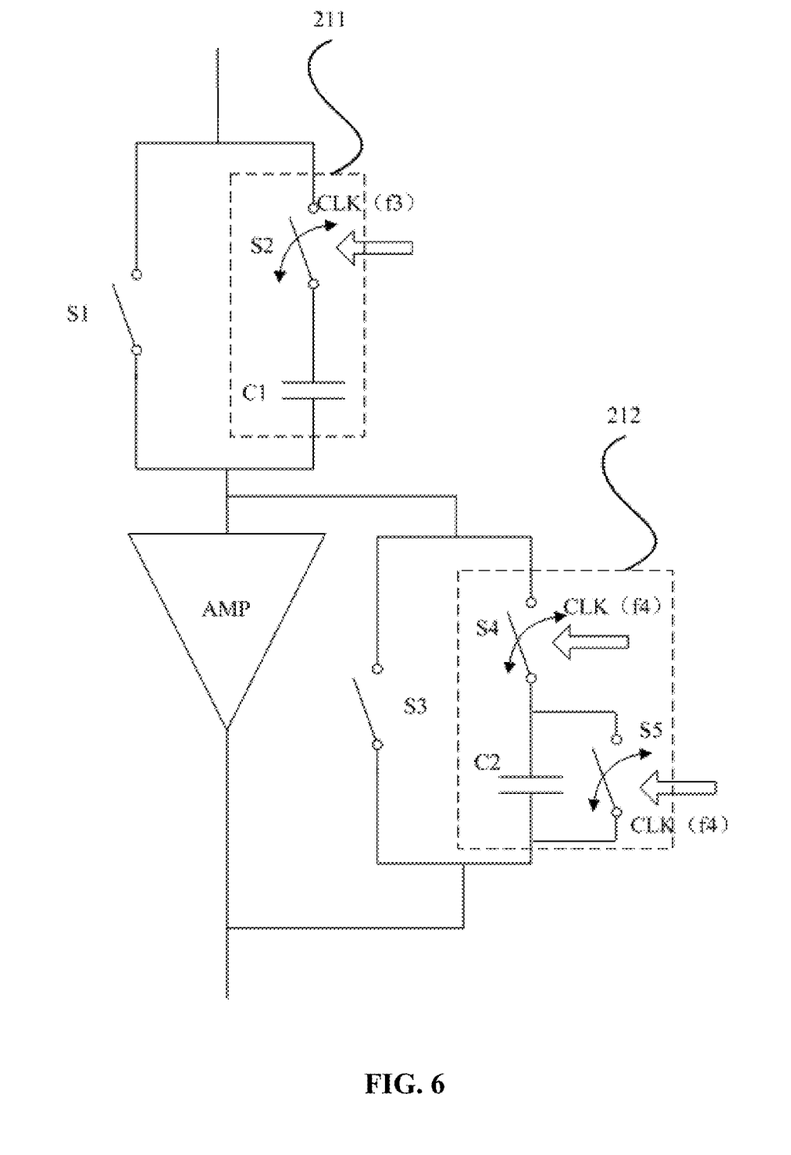
FIG. 6 schematically illustrates a diagram of a signal conversion circuit in a fourth conversion mode according to an embodiment.

Referring to FIG. 6, FIG. 6 schematically illustrates a diagram of a signal conversion circuit in a fourth conversion mode according to an embodiment.

In some embodiments, the sensing array includes a source follower. Therefore, an electric signal output by the sensing array is a voltage signal. In this case, the input switch S1 is turned off, and the first switch S2 of the input switched capacitor 211 is controlled by the clock pulse signal CLK; the feedback switch S3 is turned off, the second switch S5 and the third switch S4 of the feedback switched capacitor 212 are controlled by the clock pulse signal CLK, and a phase of the clock pulse signal of the second switch is opposite to a phase of the clock pulse signal of the third switch. In some embodiments, the clock pulse signal applied to the first switch S2 has a third frequency f3, and the clock pulse signal applied to the second switch S5 and the third switch S4 has a fourth frequency f4.

When in the fourth conversion mode, the input switched capacitor 211 and the feedback switched capacitor 212 are both equivalent to a resistor. Equivalent resistance R1 of the input switched capacitor 211 is inversely proportional to a product of the third frequency f3 and capacitance of the first capacitor C1, and equivalent resistance R2 of the feedback switched capacitor 212 is inversely proportional to a product of the fourth frequency f4 and capacitance of the second capacitor C2. In some embodiments, the equivalent resistance is within a range from 1 kΩ to 100 MΩ. In the fourth mode, the signal conversion circuit is equivalent to an inverting amplifier, receives a voltage signal, and outputs a voltage signal.

In some embodiments, a high-frequency clock pulse signal may be used as a fundamental frequency, and pulse signals with other frequencies may be generated by frequency division or by other means. The third frequency f3 and the fourth frequency f4 are controlled to adjust the first equivalent resistance R1 and the second equivalent resistance R2, so as to adjust a gain of the signal conversion circuit.

Therefore, by controlling the on-off of the input switch S1 and the feedback switch S3 and the frequency of the clock pulse signal output by the pulse signal module, the conversion modes of the signal conversion circuit can be adjusted so that the signal readout circuit can be applied to different sensing arrays. In addition, different frequencies of the clock pulse signal can adjust the equivalent impedance of the input switched capacitor 211 and the equivalent impedance of the feedback switched capacitor 212. Therefore, the signal readout circuit can change component values in a wide range without increasing area cost, so that signals within a large range output by the sensing array can be processed.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A signal conversion circuit, comprising:
   an operational amplifier, configured to amplify an electric signal output by a sensing array;
   an input switched capacitor, wherein an end of the input switched capacitor is configured to receive the electric signal output by the sensing array, and another end of the input switched capacitor is coupled with an input end of the operational amplifier; and
   a feedback switched capacitor, wherein an end of the feedback switched capacitor is coupled with the input end of the operational amplifier, and another end of the feedback switched capacitor is coupled with an output end of the operational amplifier,
   wherein an equivalent impedance of the input switched capacitor and/or an equivalent impedance of the feedback switched capacitor are related to an output characteristic of the sensing array.

2. The signal conversion circuit according to claim 1, further comprising:
   an input switch, configured to control the input switched capacitor to access the signal conversion circuit or not; and
   a feedback switch, configured to control the feedback switched capacitor to access the signal conversion circuit or not.

3. The signal conversion circuit according to claim 2, wherein the input switched capacitor comprises a first switch and a first capacitor, the first switch is configured to adjust the equivalent impedance of the input switched capacitor.

4. The signal conversion circuit according to claim 3, wherein the feedback switched capacitor comprises a second capacitor and a second switch connected in parallel, and a third switch connected with the second capacitor and the second switch, the second switch and the third switch are configured to adjust the equivalent impedance of the feedback switched capacitor.

5. The signal conversion circuit according to claim 4, wherein the sensing array comprises a passive pixel structure and outputs a charge signal, the input switch is configured to control the input switched capacitor to be short-circuited, the feedback switch is turned off, the second switch is turned off, and the third switch is turned on.

6. The signal conversion circuit according to claim 4, wherein the sensing array comprises a passive pixel structure and outputs a current signal, the input switch is configured to control the input switched capacitor to be short-circuited, the feedback switch is turned off, the second switch and the third switch of the feedback switched capacitor are controlled by a clock pulse signal having a first frequency, and a phase of the clock pulse signal of the second switch is opposite to a phase of the clock pulse signal of the third switch.

7. The signal conversion circuit according to claim 6, further comprising a pulse signal module, wherein the pulse signal module is configured to generate the clock pulse signals.

8. The signal conversion circuit according to claim 4, wherein the sensing array comprises an active pixel structure and outputs a current signal, the input switch is configured to control the input switched capacitor to be short-circuited, the feedback switch is turned off, the second switch and the third switch of the feedback switched capacitor are controlled by a clock pulse signal having a second frequency, and a phase of the clock pulse signal of the second switch is opposite to a phase of the clock pulse signal of the third switch.

9. The signal conversion circuit according to claim 8, further comprising a pulse signal module, wherein the pulse signal module is configured to generate the clock pulse signals.

10. The signal conversion circuit according to claim 4, wherein the sensing array comprises an active pixel structure and outputs a voltage signal, the input switch is turned off and the first switch of the input switched capacitor is controlled by a clock pulse signal, the feedback switch is turned off and the second switch and the third switch of the feedback switched capacitor are controlled by a clock pulse signal, and a phase of the clock pulse signal of the second switch is opposite to a phase of the clock pulse signal of the third switch.

11. The signal conversion circuit according to claim 10, further comprising a pulse signal module, wherein the pulse signal module is configured to generate the clock pulse signals.

12. The signal conversion circuit according to claim 1, wherein the signal output by the sensing array comprises an electric signal selected from different kinds of electric signal.

13. The signal conversion circuit according to claim 12, wherein the signal output by the sensing array comprises a charge signal, a current signal or a voltage signal.

14. A signal readout circuit, comprising:
a plurality of readout branches, wherein each of the plurality of readout branches comprises: the signal conversion circuit according to claim 1.

15. The signal readout circuit according to claim 14, further comprising:
a multiplexer module, configured to multiplex and output a plurality of output signals of the sensing array.

16. The signal readout circuit according to claim 14, further comprising:
a sampling module, configured to perform correlated double sampling on an output signal of the signal conversion circuits and output an analog sampled signal.

17. The signal readout circuit according to claim 16, further comprising:
an analog-to-digital conversion module, configured to convert the analog sampled signal output by the sampling module into a digital signal.

18. The signal readout circuit according to claim 14, further comprising:
a pulse signal module, configured to output clock pulse signals with different frequencies to the signal conversion circuits to adjust equivalent impedance of the signal conversion circuits.

19. The signal readout circuit according to claim 14, wherein the sensing array is disposed in a TFT image sensor.

* * * * *